United States Patent [19]

Holyer

[11] Patent Number: 4,611,929
[45] Date of Patent: Sep. 16, 1986

[54] SATELLITE METHOD FOR MEASURING SEA SURFACE TEMPERATURE

[75] Inventor: Ronald J. Holyer, Carriere, Miss.

[73] Assignee: The United States of America as represented by the Secretary of the Navy, Washington, D.C.

[21] Appl. No.: 477,199

[22] Filed: Mar. 21, 1983

[51] Int. Cl.$^4$ .............................................. G01J 5/00
[52] U.S. Cl. .................................... 374/124; 374/121
[58] Field of Search ...................... 343/5 W, 352, 358; 250/334, 338, 340, 330, 349; 358/113; 374/112, 113, 124, 136, 137, 123, 131, 6, 130, 167; 324/323

[56] References Cited

U.S. PATENT DOCUMENTS

| | | | |
|---|---|---|---|
| 3,153,147 | 10/1964 | Bradley et al. | 324/323 |
| 3,191,035 | 6/1965 | Brumfield | 250/334 |
| 3,430,045 | 2/1969 | Bjork et al. | 374/124 |
| 3,498,132 | 3/1970 | Smith et al. | 73/355 |
| 3,583,223 | 9/1971 | Olsson | 374/124 |
| 3,745,830 | 7/1973 | Smith, Jr. | 374/127 |
| 3,749,823 | 7/1973 | Warner | 374/124 |
| 4,115,776 | 9/1978 | Roeder et al. | 343/351 |
| 4,178,100 | 12/1979 | Levis | 343/351 |
| 4,240,079 | 12/1980 | Zhilin | 343/352 |
| 4,499,470 | 2/1985 | Stacey | 343/352 |
| 4,509,048 | 4/1985 | Jain | 343/5 W |

Primary Examiner—Charles Frankfort
Assistant Examiner—W. Morris Worth
Attorney, Agent, or Firm—R. F. Beers; T. M. Phillips

[57] ABSTRACT

A satellite method for measuring sea surface temperature uses simultaneous coverage by two satellites in the same spectral window plus a simplified atmospheric radiative transfer model. A geostationary satellite and any polar orbiting satellite provide nearly coincident infrared imagery of a given area with points of equal and unequal observation angles. The calibration curve of the data for one satellite is adjusted to match the temperatures of the better calibrated satellite data along the equal angle points. A difference image is obtained from the resulting two satellite temperature images. The difference image together with the two observation angles and the temperature of the more accurate satellite radiometer are input to a suitable atmospheric model to obtain sea surface temperature at each point in the study area. The result is an accurate sea surface temperature for each point within a given area which is corrected for a spatially variant atmosphere.

4 Claims, 2 Drawing Figures

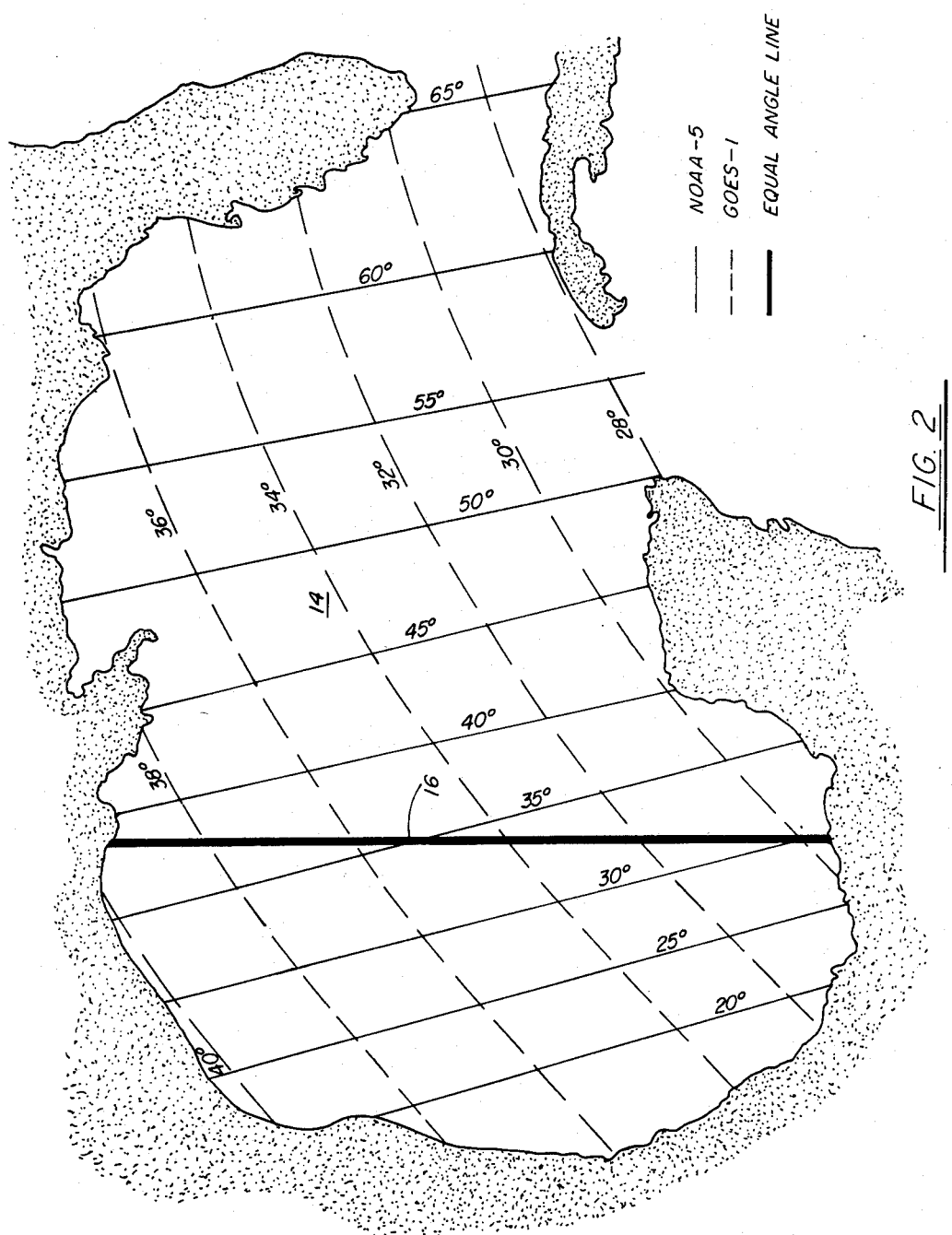

SATELLITE METHOD FOR MEASURING SEA SURFACE TEMPERATURE

BACKGROUND OF THE INVENTION

1. Field of the Invention

The present invention relates to methods for remotely measuring temperature, and more particularly to a satellite method for measuring sea surface temperature.

2. Description of Prior Art

A major factor limiting the accuracy of satellite infrared measurements of sea surface temperature is the inability to accurately account for the absorption and emission of the intervening atmosphere. The calculation of atmospheric corrections from radiosonde data and force-fitting satellite temperatures to surface data have been two popular methods of making corrections for atmospheric effects. Both methods require the assumption of a horizontally uniform atmosphere since they apply a correction based on observations at one or two points to data over ocean areas many hundreds of kilometers in size. However, horizontal uniformity in the atmosphere often does not exist, especially in areas of high surface temperature gradients. Here, coupling between the atmosphere and the ocean produces atmospheric temperature and water vapor gradients which reflect the sea surface temperature patterns below. Atmospheric corrections which vary spatially to compensate for horizontal atmospheric variability are required for consistently accurate measurements of sea surface temperature.

Several approaches to a spatially variant atmospheric correction have been proposed. One technique uses the High Resolution Infrared Sounder (HIRS) for atmospheric correction. This technique is limited by the fact that HIRS provides relatively crude estimates of temperature and humidity profiles with poor spatial resolution (42 Km along-track sampling interval). The multiple window approach is another spatially variant correction possibility. Present generation satellites with channels at 3.55–3.93 $\mu$m, 10.5–11.5 $\mu$m and 11.5–12.5 $\mu$m offer the potential for atmospheric correction based on differences between observed sea surface temperatures in these three spectral windows. The temperature differences arise from varying degrees of atmospheric water vapor absorption at the different wavelengths. However, due to noise and possible sunlight contamination at 3.55–3.93 $\mu$m, and calibration problems, this approach has developed slowly.

Another recent approach to spatially variant atmospheric corrections uses a least-squares polynomial fit to corrections calculated from a set of shore-based radiosondes. This method is limited to regional-scale areas where the atmosphere can be accounted for synoptically. The method further assumes that shore-based radiosonde data adequately represents the marine environment.

Thus, what is desired is a method for achieving spatially variant atmospheric corrections with high accuracy over the marine environment.

SUMMARY OF THE INVENTION

Accordingly, the present invention provides a satellite method for measuring sea surface temperature which uses simultaneous coverage by two satellites in the same spectral window plus a simplified atmospheric radiative transfer model. A geostationary satellite and any polar orbiting satellite provide nearly coincident infrared imagery of a given area with points of equal and unequal observation angles. The calibration curve of the data for one satellite is adjusted to match the temperatures of the better calibrated satellite data along the equal angle points. A difference image is obtained from the resulting two satellite temperature images. The difference image together with the two observation angles and the temperature of the more accurate satellite radiometer are input to a suitable atmospheric model to obtain sea surface temperature at each point in the study area. The result is an accurate sea surface temperature for each point within a given area which is corrected for a spatially variant atmosphere.

Therefore, it is an object of the present invention to provide a satellite method for measuring sea surface temperatures which corrects the temperature data for a spatially variant atmosphere.

Other objects, advantages and novel features will be apparent from the following detailed description when read in conjunction with the appended claims and attached drawing.

BRIEF DESCRIPTION OF DRAWING

FIG. 2 is a plan view of a marine area showing observation angles for two operational satellites.

DESCRIPTION OF THE PREFERRED EMBODIMENT

Figure 1:
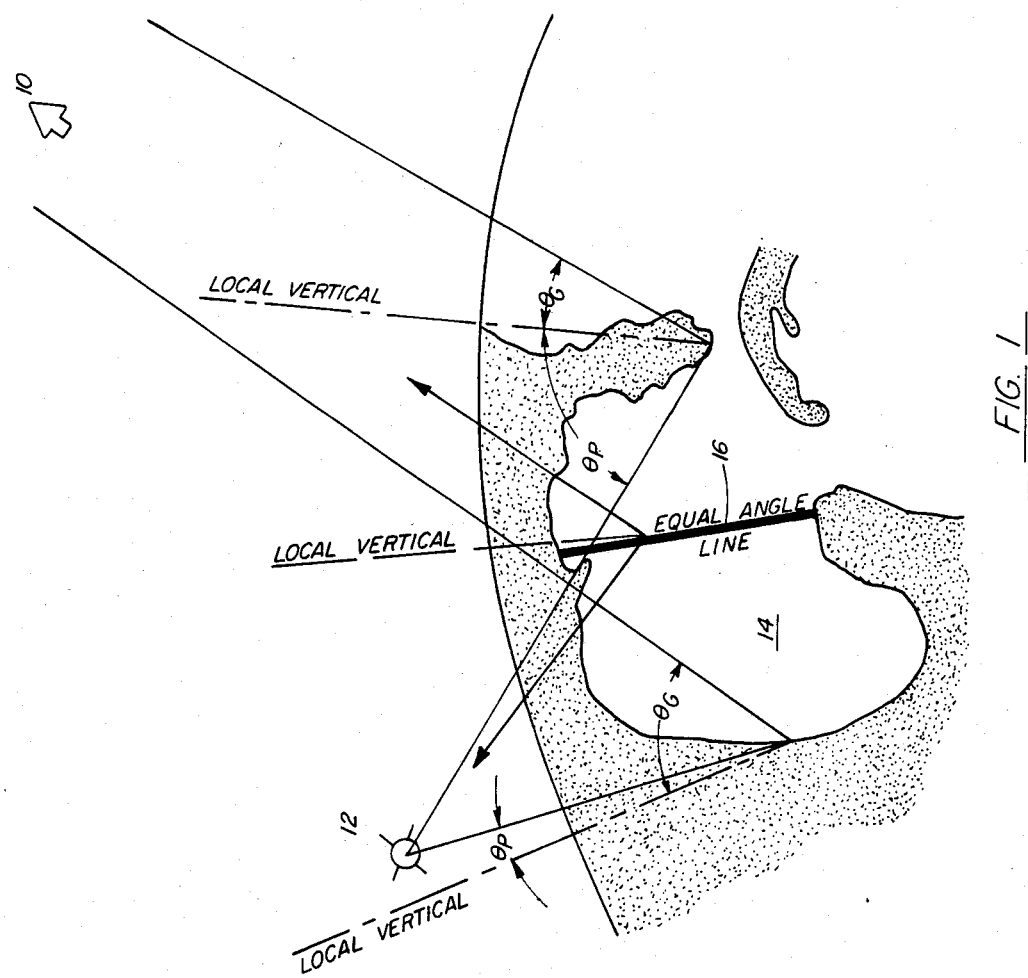
FIG. 1 is a geometrical view of a two-satellite method for measuring sea surface temperature according to the present invention.

Referring to FIG. 1 a geostationary satellite 10, such as the Geostationary Operational Environmental Satellites (GOES), orbits over the equator at an altitude of approximately 35,000 Km. For GOES infrared imagery is recorded every 30 minutes so the data is always available nearly coincident with the overflight of a polar orbiting satellite 12. Current polar orbiters acquire infrared imagery of a given location at 12 hour invervals at altitudes ranging from 800 to 1500 Km. Because of the differences between the polar and geostationary orbits, the observation angles, $\theta_p$ and $\theta_G$ respectively, from these two types of satellites cover different angular ranges over a typical oceanographic study area 14, shown as the Gulf of Mexico. For a given pass of a polar orbiter 12 there will be a line 16 in the study area 14 where the two satellites 10 and 12 view the surface at the same angle. At all other locations the two view the surface from different angles.

The sensors aboard the geostationary satellite 10 and the polar orbiting satellite 12 should observe the same apparent sea surface temperature values along the equal angle line 16 since both satellites are looking at the same point on the ocean surface through the same atmospheric path length. If the observed temperatures along the equal angle line 16 are not equal, the significant factor is calibration differences between the two sensors. The calibration errors are eliminated by adjusting the calibration curve of one satellite so that the temperatures along the equal angle line 16 match the temperatures of the other satellite, i.e., the satellite which is considered to be better calibrated. In the example of GOES' Visible Infrared Spin Scan Radiometer (VISSR) and a NOAA satellite using the Very High Resolution Radiometer (VHRR) the GOES data is forced to match the NOAA data since the VHRR is dynamically calibrated on each scan from internal reference blackbodies while the VISSR has only a once per image look at a shutter device.

The next step is to subtract the two temperature images to form a temperature difference image over the entire study area 14. The difference image has non-zero values at all locations except along the equal angle line 16. The magnitude of the difference depends on the difference in viewing angles and on the properties of the atmosphere. The two-satellite method thus associates four variables: the satellite observation angles, $\theta_p$ and $\theta_G$; the temperature difference, $\Delta T_{G-p}$; and the temperature of the unadjusted data, $T_p$ for each location in the study area 14. With a suitable atmospheric model these variables are related to sea surface temperature, $T_s$, at each point.

One factor to consider is the effect of sensor noise. Since the atmospheric correction is based on a temperature difference, noise in the two data sets that produce the difference image is translated into noise in the atmospheric correction. Sensor noise, expressed as a noise equivalent temperature difference (NE $\Delta T$), is especially important as the distance from the equal angle line 16 decreases because the temperature difference values become small near the equal angle line and the noise in the difference image can exceed the magnitude of the temperature difference expected from path length considerations. The atmospheric correction uncertainty resulting from instrument noise is a complex function of the atmospheric properties, observation angles at the equal angle line 16, distance of a pixel (location) under consideration from the equal angle line, and the NE $\Delta T$ of the geostationary and polar orbiting radiometers. As the pixel size is increased, lower spatial resolution, the effect of instrument noise on the resulting atmospheric correction is reduced. Therefore, it is possible to trade off spatial resolution for reduced noise or for extending the useful correction area closer to the equal angle line 16.

The absorption and emission of infrared radiative energy in the atmosphere is due mainly to vibrational and energy bands of the triatomic molecules: water vapor, carbon dioxide and ozone. A complete radiative transfer model of the atmosphere would account for both the absorption and the emission of these atmospheric gases plus the effects of atmospheric particulate matter called aerosols and other minor constituents. Sophisticated models of this type, such as LOWTRAN-5, are based on the radiative transfer equation which in integral form is $$N = \int_{\nu_1}^{\nu_2} \tau_s(\nu) B(\nu, T_s) d\nu + \int_{\nu_1}^{\nu_2} \int_0^H \frac{d\tau(\nu)B}{dh}(\nu, T(h)) dh d\nu \quad (1)$$

where
N = radiance emerging from top of atmosphere
$\nu$ = wavenumber
h = height above sea surface
H = altitude of satellite
$B(\nu,T)$ = Planck's function
$\tau(\nu)$ = transmissivity from height h to satellite height H $\tau_s(\nu)$ = transmissivity of atmosphere from surface to satellite
T(h) = absolute temperature of atmosphere
$T_s$ = temperature of earth's surface
$\nu_1, \nu_2$ = limits of spectral band under consideration.

It is implicit in this formulation that the atmosphere is absorbing and emitting but not scattering, and that the emissivity of the sea surface is unity. The first term of equation (1) represents the contribution to the received radiance resulting from emission from the surface of the ocean, $N_s$. The second term is the contribution resulting from emission within the atmospheric column, $N_a$. Equation (1) cannot in general be solved in closed form, so computationally very lengthy numerical methods are normally used to solve a numerical analog. Furthermore, solution requires vertical profiles of atmospheric temperature and humidity plus spectral transmissivity profiles for carbon dioxide, ozone, aerosols and the other minor atmospheric constituents. Thus a simplified radiative transfer equation is highly desirable.

Considerable simplification is achieved by employing the Mean Value Theorem for definite integrals which states that if f(x) is continuous over the range $a \leq x \leq b$, then $$\int_a^b f(x) dx = f(X)(b-a) \quad (2)$$

for some X, such that $a \leq x \leq b$. This theorem applied to the integrals over $\nu$ and h in equation (1) gives $$N + \bar{\tau}_s \bar{B}(T_s) + (1 - \bar{\tau}_s) \bar{B}(\bar{T}) = N_a + N_s. \quad (3)$$

In equation (3) $\bar{\tau}_s$ and $\bar{B}(T)$ are mean values resulting from applications of the Mean Value Theorem to the spectral integrals, and $\bar{B}(\bar{T})$ is the integrated Planck's function for an effective mean atmospheric temperature $\bar{T}$ resulting from application of the Mean Value Theorem to the height integral. Although equation (3) offers simplified mathematics, the solution remains generally intractable for atmospheric correction work since for a location in mid-ocean neither $\bar{\tau}_s$ nor $\bar{T}$ are known. But since $N_s$ is proportional to $\bar{\tau}_s$ and $N_a$ is proportional to $(1 - \bar{\tau}_s)$, a possible relationship between $N_s$ and $N_a$ is suggested. The functional form of the relationship is not obvious since $\bar{T}$ is related to $\bar{\tau}_s$ in some unknown manner and $N_a$ is unrelated to $T_s$ which figures heavily into $N_s$. However, calculations with the radiative transfer equation (1) show that a very simple relationship exists between $N_s$ and $N_a$ for certain typical, frequently encountered atmospheric conditions such as tropical, mid-latitude summer, mid-latitude winter, sub-arctic summer, sub-arctic winter and a 1962 U.S. Standard. Except for the two warmest and most humid cases, i.e., tropical and mid-latitude summer which have the largest $N_a$ values, the relationship between $N_s$ and $N_a$ is linear for a given value of $T_s$ ($273K \leq T_s \leq 303K$). Since remote sensing of sea surface temperature through tropical or mid-latitude summer atmospheres is not currently feasible, these two cases are ignored. For atmospheric conditions where good remote sensing is possible, i.e., the four driest atmospheres, a tight linear relationship exists between $N_s$ and $N_a$. The slope of the linear relationship is a function of surface temperature, $T_s$, resulting in the expression $$N_a = (N_s - \bar{B}(T_s))/S(T_s) \quad (4)$$

where $S(T_s)$ is the slope determined from LOWTRAN-5 simulations. Thus, $N_a$, the atmospheric contribution to the radiance observed at the satellite, is expressed as a function of $T_s$, the sea surface temperature, and $N_s$, the surface radiance contribution to the satellite measurement. The troublesome second term of the radiative transfer equation can now be handled by means of the two-satellite method described herein. The slope, $S(T_s)$, is a function of the sea surface temperature and is unaffected by the path angle through the atmosphere. Table I gives a typical $S(T_s)$ values as a function of $T_s$:

TABLE I

| $T_s$ | $S(T_s)$ |
|---|---|
| 0° C. | .79 |
| 10° | .93 |
| 20° | 1.09 |
| 30° | 1.26 |

At about 13.5° C. $S(T_s)$ has a value of $-1$ which means that the radiance absorbed by the atmosphere is exactly balanced by the energy emitted by the atmosphere so that the radiance observed at the satellite is independent of atmospheric type provided one avoids the warm, humid extremes.

Combining equation (4) with equation (3) gives the following simplified radiative transfer equation:

$$N = \tau_s + S^{-1}(T_s)\bar{\tau}_s - S^{-1}(T_s)\bar{B}(T_s). \quad (5)$$

For simplicity of notation define $\bar{\tau}_s'$ as an "effective transmissivity" given by $$\bar{\tau}_s' = \tau_s + S^{-1}(T_s)\bar{\tau}_s - S^{-1}(T_s) \quad (6)$$

and the radiative transfer equation becomes $$N = \bar{\tau}_s' \bar{B}(T_s). \quad (7)$$

The effective transmissivity over a path at angle $\theta$ with respect to the local vertical, $\bar{\tau}_s'(\theta)$, is required by the two-satellite method. Calculations of $\bar{\tau}_s'(\theta)$ using LOWTRAN-5 show that for the four relatively cool, dry atmospheres, $\bar{\tau}_s'(\theta)$ is closely approximated by $$\bar{\tau}_s'(\theta) = \bar{\tau}_s'^{0.9 \sec\theta}. \quad (8)$$

Transforming equation (8) into an equation involving temperature and transmittance is accomplished by integrating the radiant energy emitted by a blackbody over the spectral range of interest as a function of temperature over the range 270 to 300K. In the 10.5 to 12.5 $\mu$m spectral range the energy is related to temperature to the 4.36 power. Thus equation (8) becomes $$\Delta T_{atm} = T_s(\bar{\tau}_s'(0)^{0.206 \sec\theta} - 1) \quad (9)$$

where $\Delta T_{atm}$ is the temperature suppression resulting from atmospheric attenuation, and the constant 0.206 is 0.9 times the reciprocal of the calculated 4.36 temperature exponent.

Algebraic manipulation of equation (9) plus the approximation $T_s \simeq T_p$ results in the following relationship for the four variables $\theta_G$, $\theta_p$, $T_p$ and $\Delta T_{G-P}$.

$$T_p(\bar{\tau}_s'(0)^{0.206 \sec\theta_G} - \bar{\tau}_s'(0)^{0.206 \sec\theta_P}) = \Delta T_{G-P} \quad (10)$$

Equation (10) is used to obtain a $\bar{\tau}_s'(0)$ value for each unequal location in the study area 14. The $\bar{\tau}_s'(0)$, $T_p$ and $\theta_p$ values for each location then are inserted into equation (9) to obtain $\Delta T_{atm}$. Addition of $\Delta T_{atm}$ to $T_p$ gives $T_s$, the corrected sea surface. The result is a numerical field of sea surface temperature values, atmospherically corrected in a manner that accounts for that portion of the horizontal variability of the atmosphere that exists on scales larger than the spatial resolution of the satellite data.

In operation, using GOES-1 and NOAA-5 with a 10.5 to 12.5 $\mu$m spectral window, the application of this two satellite method begins with the calibration of the respective radiometer data sets. Calibration of the NOAA-5 VHRR is accomplished by using onboard reference blackbodies whose temperatures are monitored by thermistors. Blackbody video signals, thermistor voltages and other housekeeping data are included in the data stream for each scanline. By extracting these data a digital value-to-temperature relationship is established. The GOES-1 VISSR calibration is taken from standard published tables relating digital value to temperature.

After-calibration images are registered to a common latitude-longitude projection by picking identifiable landmarks around the study area 14, the Gulf of Mexico in this instance, and using these to develop a set of two-dimensional, third order polynomials which warp the satellite data to the desired projection. The GOES-1 data is obtained every 30 minutes, so the concurrency of data is $\pm 15$ minutes. Since the GOES pixel size is 8 Km, assuming a mean wind velocity of 4 m/s the horizontal atmospheric displacement is less than 4 Km, well within the GOES pixel size. The NOAA pixel size is 1 Km, so the spatial responses between the satellites are minimized by averaging the 1 Km resolution NOAA data to match the 8 Km spatial resolution of GOES.

The next step is to calculate the observation angles with respect to local vertical as shown in FIG. 2. Once the position of the equal angle line 16 is determined, the GOES and NOAA temperatures are compared in the vicinity of this line. The GOES temperatures are increased by the offset found, preventing miscalibration from introducing errors into the atmospheric correction. Then the difference between the NOAA-5 and GOES-1 temperature fields is calculated to produce a temperature difference image. All variables required are now at hand. The observation angles, $\theta_G$ and $\theta_P$, are known, $T_P$ is known and $\Delta T_{G-P}$ is obtained from the temperature difference image. Applying these variables to equation (10) provides the vertical effective transmittance of the atmosphere, $\bar{\tau}_s'(0)$ at each point over the study area from which the atmospheric correction values, $\Delta T_{atm}$, are obtained and added to the NOAA temperature data set, $T_P$ to produce the corrected sea surface temperature, $T_s$ for each paint of the study area.

Although the method described above uses two satellites, it it also applicable to a single satellite having a single sensor with a scan configuration which gives two looks at the same point from two different angles. Such a sensor package, the Along-Track Scanning Radiometer with Microwave sounder (ATSR-M), is currently under development. Since there is a single sensor, there are no calibration differences for which to compensate, resulting in a simplification of the methodology. Otherwise the steps of obtaining two data sets, formulating the temperature difference image and calculating the corrected sea surface temperature data set are the same.

Thus, the present invention provides a satellite method for measuring sea surface temperature using nearly coincident sets of temperature data and satellite geometry to obtain for each point in the study area four variables: the satellite look angles, $\theta_G$ and $\theta_p$, relative to the local vertical; the temperature data from the more accurate of the two satellites; and the temperature difference image. Applying these four variables to a relatively simple atmospheric model results in highly accurate values for sea surface temperatures corrected for a spatially variant atmosphere.

What is claimed is:

1. A satellite method for measuring sea surface temperature comprising the steps of:
   obtaining a temperature image data set comprising temperature data for each point of a common study area from each of two satellites nearly concurrently;
   adjusting one of said temperature image data sets to form an adjusted temperature data set so that the values for each of said data sets are identical along a line across said study area where both satellites have equal observation angles relative to the local vertical from each of said satellites, the unadjusted temperature data set being a reference temperature image data set;
   subtracting said adjusted temperature data set from said reference temperature image data set to form a temperature difference image for said study area; and
   calculating a corrected sea surface temperature data set for said study area by applying said reference temperature image data set, said temperature difference image and observation angles relative to a local vertical from each of said satellites for each point of said study area to an atmospheric model to compensate for the horizontal variability of the atmosphere.

2. A satellite method as recited in claim 1 wherein said satellites comprise:
   a geostationary satellite; and
   a polar orbiting satellite, each of said satellites having the same spectral window for obtaining said temperature image data sets.

3. A satellite method as recited in claims 1 or 2 wherein the step of calculating comprises:
   computing an effective transmissivity for each point of said study area from said reference data set, said temperature difference image and said observation angles from said satellites;
   obtaining a temperature suppression for each point of said study area based upon said effective transmissivity and said reference data set; and
   adding said temperature suppression to said reference data set to obtain said corrected sea surface temperature data set.

4. A satellite method for measuring sea surface temperature comprising the steps of:
   obtaining a temperature image data set of temperature data for each point of a common study area from each of two different observation angles nearly concurrently;
   formulating a temperature difference image from said temperature data sets; and
   calculating a corrected sea surface temperature data set for said study area by applying one of said temperature data sets as a reference data set, said temperature difference image and observation angles relative to a local vertical for each point of said study area to an atmospheric model to compensate for the horizontal variability of the atmosphere.

* * * * *